United States Patent

Takita et al.

Patent Number: 5,938,964
Date of Patent: Aug. 17, 1999

[54] HIGH FREQUENCY HEATING METHOD OF A BOLT WITH HOLE

[75] Inventors: Katsuhiko Takita; Takayuki Kawano; Takijiro Shimamoto; Kouichi Ide, all of Nagasaki, Japan

[73] Assignee: Mitsubishi Heavy Industries, Ltd., Tokyo, Japan

[21] Appl. No.: 09/018,732

[22] Filed: Feb. 4, 1998

[30] Foreign Application Priority Data

Dec. 25, 1997 [JP] Japan ................................. 9-357568

[51] Int. Cl.⁶ ....................................................... H05B 6/10
[52] U.S. Cl. ........................................... 219/635; 219/644
[58] Field of Search ................................... 219/644, 635, 219/667, 665, 673

[56] References Cited

U.S. PATENT DOCUMENTS

| | | | |
|---|---|---|---|
| 4,181,845 | 1/1980 | Bolton et al. | 219/8.5 |
| 4,590,346 | 5/1986 | Sugihara et al. | 219/10.43 |
| 4,625,090 | 11/1986 | Pfaffmann et al. | 219/10.57 |
| 5,393,959 | 2/1995 | Kitano et al. | 219/619 |
| 5,397,876 | 3/1995 | Shimamoto et al. | 219/644 |
| 5,523,546 | 6/1996 | Lake et al. | 219/644 |
| 5,718,776 | 2/1998 | Yoshie et al. | 148/320 |
| 5,801,358 | 9/1998 | Yokoyama et al. | 219/634 |

FOREIGN PATENT DOCUMENTS

7-114984  5/1995  Japan.

Primary Examiner—Teresa Walberg
Assistant Examiner—Jeffrey Pwu
Attorney, Agent, or Firm—Wenderoth, Lind & Ponack, L.L.P.

[57] ABSTRACT

A high frequency heating method of a bolt sets a maximum achievable temperature Tmax in an inner surface of the bolt with hole to a value which is not higher than a final heat treated temperature To. A maximum thermal stress σmax occurring in the bolt with hole is set to a value which is not more than a yield stress σys of the bolt material. From the maximum thermal stress σmax, a temperature difference ΔT is obtained between Tmax and a mean temperature Tmean along an entire cross section of the bolt, under the condition that ΔT is to be not more than a permissible maximum temperature difference ΔTo obtainable from the yield stress of the material. The maximum suppliable power by Tmax, ΔT and dimensions of the bolt are obtained, and then a heater is inserted into a small diameter hole of the bolt with hole and the maximum suppliable power, which value is obtained by the above operation, is supplied to the heater so that the bolt with hole is heated to be elongated. The temperature of the bolt with hole, while it is being heated, is not higher than To, and hence lowering of the material strength can be prevented. The thermal stress is not higher than σys, hence the life consumption due to fatigue can be suppressed and loosening of the bolt with hole within a short time becomes possible.

6 Claims, 7 Drawing Sheets

HIGH FREQUENCY HEATING METHOD OF A BOLT WITH HOLE

BACKGROUND OF THE INVENTION

1. Field of the Invention

The present invention relates to a high frequency heating method of a bolt with hole for heating the bolt with hole for fastening and loosening thereof by inserting a coil into a central hole of the bolt with hole used for fastening a steam turbine casing and the like and by supplying a high frequency current to the coil.

2. Description of the Prior Art

A casing of a steam turbine and the like consists of two split bodies of an upper case and a lower case, which are fastened together to form one unit by a bolt inserted into a hole bored in a flange of the upper case and the lower case, respectively.

In an operation condition, the bolt is fastened firmly to the casing for securing "gas tightness of the casing", but in case of opening the casing for inspection, maintenance services, etc. of the turbine, the bolt is to be loosened for separation of the upper case and the lower case.

For such cases of fastening the bolt firmly to the flange for securing gas tightness of the casing or of loosening the bolt for opening the casing, heating of the bolt is carried out for elongation thereof.

For example, in the Japanese laid-open patent application No. Hei 7(1995)-114984, a bolt heating means by use of a coil is disclosed wherein the coil is inserted into a central hole of the bolt and a high frequency current is supplied to the coil so as to generate an eddy current in an inner surface of the central hole and to heat the inner surface of the central hole by Joule's heat caused by an inside resistance against the eddy current, thus the heat is transmitted toward an outer surface of the bolt so that the bolt is heated in its entirety to be elongated.

Figure 6:
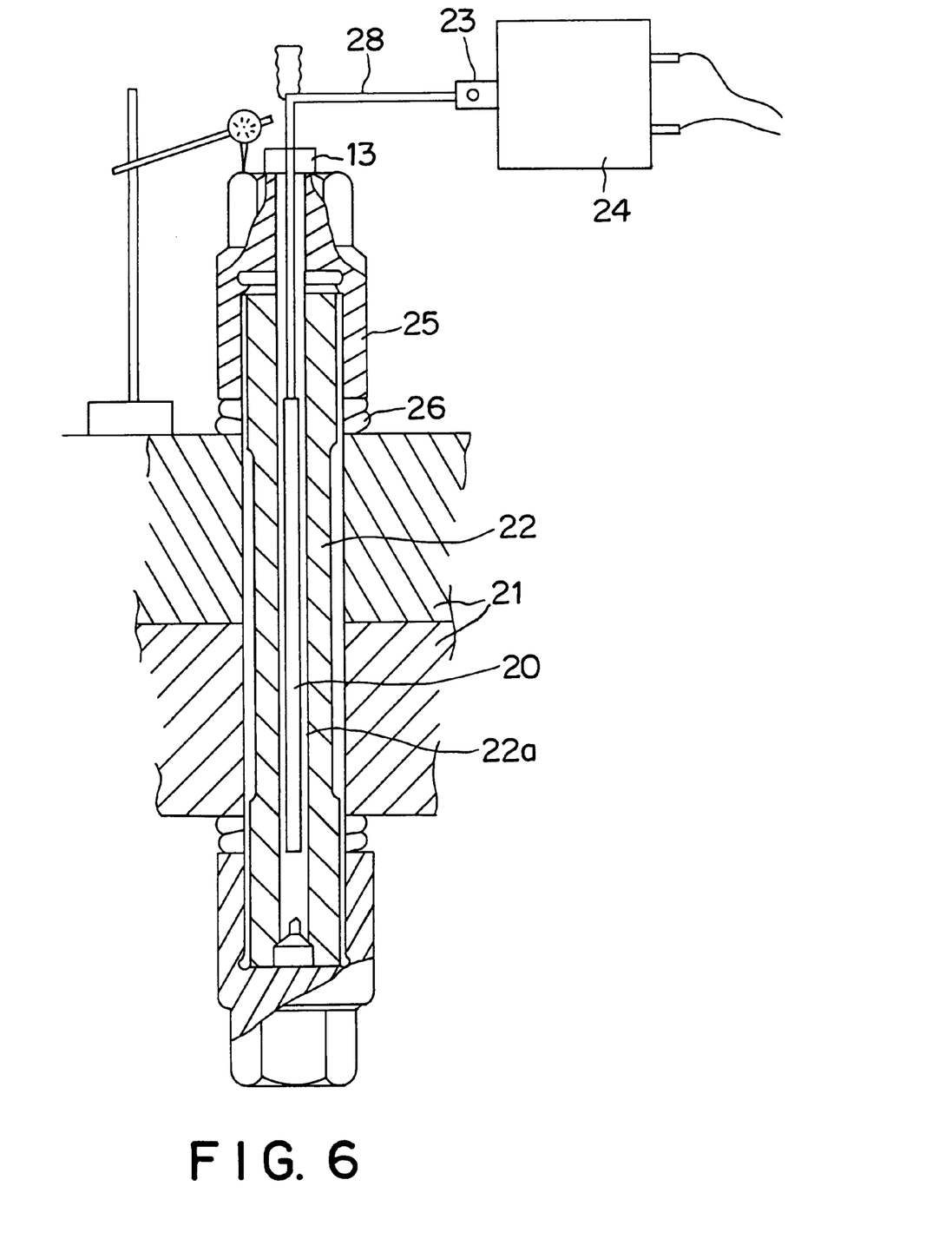
FIG. 6 is an explanatory view of a high frequency heating device.

A high frequency heating method of said kind of bolt with hole is described further with reference to FIGS. 6 and 7 by use of actual means according to the method mentioned above.

In FIG. 6, in case of loosening a metal bolt 22 which is set to a flange 21, a heater 20 is first inserted into a small diameter hole 22a of the metal bolt 22 to come to a position of a stopper 13 and a load dispatching portion 23 is connected to a high frequency transformer 24.

Figure 7A:
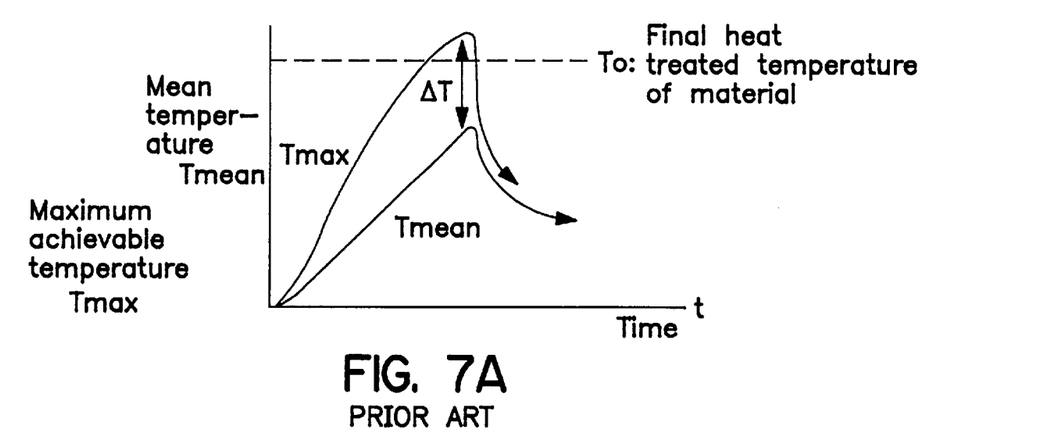
FIG. 7 is an explanatory view of a prior art high frequency heating method.
Figure 7B:
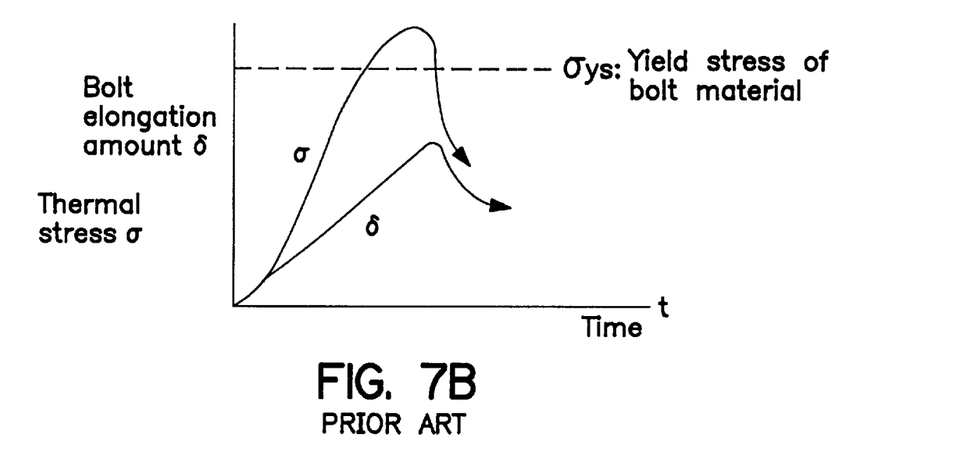
Figure 7C:
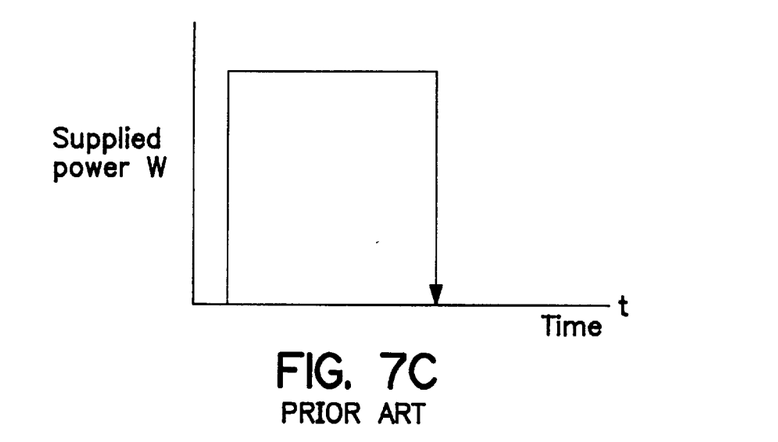

Then, as shown in FIG. 7(c), a constant high frequency power is supplied continuously to a coil of the heater 20 from the high frequency transformer 24 via the load dispatching portion 23 and a flexible cable 28 so as to generate an eddy current in an inner surface of the metal bolt 22 and thereby to heat the metal bolt 22 to be elongated and loosened. Then, a nut 25 is removed.

It is to be noted that said high frequency heating method is also applicable to a case where the metal bolt 22 is to be fastened, and in this case, the metal bolt 22 is first set to the flange 21 and then the same high frequency heating as mentioned above is carried out and the nut 25 is fastened.

According to said prior art method using the high frequency coil, while the bolt can be heated quickly, the inner surface of the central hole of the bolt is heated by Joule's heat of the eddy current and the heat is transmitted to the outer surface of the bolt to heat the entire bolt, thus there occurs a temperature gradient within the bolt.

And if this temperature gradient become large, a thermal stress with the bolt becomes large and there arises a problem to deteriorate a material of the bolt.

Accordingly, in case the bolt is heated by use of the high frequency coil as mentioned above, it is desirable to heat the bolt as quickly as possible within the range not to deteriorate the material of the bolt by the internal thermal stress.

Also, according to the prior art high frequency heating method of the bolt with hole described with the use of the actual means, a large power can be supplied so as to loosen the bolt within a short time as the result of employing such construction as described there.

However, in case the surface of the small diameter hole of the bolt is exothermically heated in the process of heat input, there may be caused an excessive temperature difference distribution $\Delta T$ within cross sections of the bolt as shown in FIG. 7(a) and in this case, a compression stress $\sigma$ which acts on the surface of the small diameter hole of the bolt exceeds a yield stress $\sigma ys$ as shown in FIG. 7(b), hence fatigue damages are accumulated on the surface of the small diameter hole and there may occur cracks of the bolt after a long time use.

Also, as the temperature of the surface of the small diameter hole rises quickly, if a large power is supplied continuously, the temperature exceeds a final heat treated temperature To of the bolt material as shown in FIG. 7(a) resulting in lowering of the yield stress or a creep rupture strength of the bolt so that there may be a loosening or a crack damage of the bolt during operation.

SUMMARY OF THE INVENTION

In order to dissolve the problems in the prior art, it is an object of the present invention to provide a high frequency heating method of a bolt with hole wherein the bolt with hole is heated by use of a coil on an optimum heat input condition.

It is a feature of the present invention to provide a high frequency heating method of a bolt with hole in which the bolt with hole fastening an equipment is inserted with a coil into a central hole of the bolt and is fastened and loosened by being heated to be elongated by Joule's heat caused by a high frequency current being supplied to the coil and an eddy current being generated in an inner surface of the central hole of the bolt with hole, characterized in comprising a step of setting a heat input condition of a heat input given to the bolt with hole by the coil so that a thermal expansion of the bolt with hole by the heating satisfies an elongation amount required of the bolt with hole, a maximum achievable temperature Tmax by the heating is not higher than a final heat treated temperature To of the bolt with hole and a maximum thermal stress $\sigma$max induced by the heating is not more than a yield stress $\sigma$ys of the bolt with hole at said maximum achievable temperature Tmax.

It is another feature of the present invention to provide a high frequency heating method of a bolt with hole applicable to fastening and loosening of the bolt with hole used for fastening an equipment and provided with a small diameter hole along an axial center of the bolt, characterized in comprising steps of inserting a heater into the small diameter hole of the bolt with hole and supplying a maximum supplyable power obtained by an operation mentioned below to the heater so that said bolt with hole is heated to be elongated, said operation comprising steps of;

setting a maximum achievable temperature Tmax in an inner surface of the bolt with hole while being heated to a value which is not higher than a final heat treated temperature To of a bolt material of the bolt with hole;

setting a maximum thermal stress $\sigma$max occurring in the bolt with hole while being heated to a value which is not more than a yield stress σys of the bolt material at said maximum achievable temperature Tmax;

obtaining from said maximum thermal stress σmax a temperature difference ΔT between said maximum achievable temperature Tmax and a mean temperature Tmean along an entire cross section of the bolt on condition that said temperature difference ΔT is to be not more than a permissible maximum temperature difference ΔTo obtainable from the yield stress of the bolt material; and obtaining the maximum supplyable power by said maximum achievable temperature Tmax, said temperature difference ΔT and dimensions of the bolt.

In the above, the maximum supplyable power is supplied to the heater so that the maximum achievable temperature Tmax in the inner surface of the bolt with hole while it is being heated becomes not higher than the final heat treated temperature To of the bolt material, hence lowering of the material strength of the bolt with hole is prevented.

Also, the maximum supplyable power is obtained by use of the temperature difference ΔT, as shown in the following equation, which is a difference between the maximum achievable temperature Tmax obtained from the maximum thermal stress occurring in the bolt with hole which it is being heated and the mean temperature Tmean along an entire cross section of the bolt.

$$\sigma max \geq E\alpha \Delta T/(1-v)$$

where E is a Young's modulus of the bolt, α is a thermal expansion coefficient and v is a Poisson's ratio, all being values that are decided by the bolt material.

Thus, the maximum thermal stress σmax is of a value which is not more than the yield stress σys of the bolt material at the maximum achievable temperature Tmax and if the maximum supplyable power is supplied to the heater, the stress acting on the surface of the small diameter hole of the bolt with hole comes within a range of elastic stress and life consumption due to fatigues can be suppressed.

It is also a feature of the present invention to provide a high frequency heating method of a bolt with hole in which the bolt with hole fastening an equipment is inserted with a coil into a central hole of the bolt and is fastened and loosened by being heated to be elongated by Joule's heat caused by a high frequency current being supplied to the coil and an eddy current being generated in an inner surface of the central hole of the bolt with hole, characterized in comprising steps of;

assuming a heat input condition of a heat input given to the bolt with hole by the coil;

obtaining a temperature distribution in the bolt with hole by a non-steady temperature analysis, based on said assumed heat input condition and material characteristics and dimensions of the bolt with hole;

deciding that a thermal expansion of the bolt with hole by said temperature distribution satisfies an elongation amount required of the bolt with hole, a maximum achievable temperature Tmax in said temperature distribution is not higher than a final heat treated temperature To of the bolt with hole and a maximum thermal stress σmax induced by said temperature distribution is not more than a yield stress σys of the bolt with hole at said maximum achievable temperature Tmax; and setting said heat input condition as a final heat input condition.

It is a further feature of the present invention to provide a high frequency heating method of a bolt with hole in which the bolt with hole fastening a flange of an equipment together with a nut is inserted with a coil into a central hole of the bolt and is fastened and loosened by being heated to be elongated by Joule's heat caused by a high frequency current being supplied to the coil and an eddy current being generated in an inner surface of the central hole of the bolt with hole, characterized in comprising steps of;

setting a heat input condition of a heat input given to the bolt with hole by said coil so that a thermal expansion of the bolt with hole by the heating satisfies an elongation amount required of the bolt with hole, a maximum achievable temperature Tmax by the heating is not higher than a final heat treated temperature To of the bolt with hole and a maximum thermal stress σmax induced by the heating is not more than a yield stress σys of the bolt with hole at said maximum achievable temperature Tmax;

heating the bolt with hole by said coil in accordance with said heat input condition while measuring the elongation amount of the bolt with hole by a measuring means; and stopping the heating by said coil upon the elongation amount of the bolt with hole arriving at a predetermined elongation amount.

It is a further feature of the present invention to provide a high frequency heating method of a bolt with hole in which the bolt with hole fastening a flange of an equipment together with a nut is inserted with a coil into a central hole of the bolt and is fastened and loosened by being heated to be elongated by Joule's heat caused by a high frequency current being supplied to the coil and an eddy current being generated in an inner surface of the central hole of the bolt with hole, characterized in comprising steps of;

a first step to assume a heat input condition of a heat input given to the bolt with hole by said coil, a second step to obtain a temperature distribution in the bolt with hole by a non-steady temperature analysis, based on said assumed heat input condition and material characteristic and dimensions of the bolt with hole, a third step to assume a maximum achievable temperature Tmas, a mean temperature Tmean along an entire cross section of the bolt with hole and a temperature difference ΔT between said maximum achievable temperature Tmax and said mean temperature Tmean, based on said temperature distribution, so as to satisfy an elongation amount required of the bolt with hole, a fourth step to decide whether said maximum achievable temperature Tmax is not higher than a final heat treated temperature To of the bolt with hole or not, a fifth step to obtain a maximum thermal stress σmax occurring in the bolt with hole, based on said temperature difference ΔT and the material characteristics of the bolt with hole, and a sixth step to decide whether said maximum thermal stress σmax is not more than a yield stress σys of the bolt with hole at said maximum achievable temperature Tmax or not; and if a decision of "No" is given to any one of said fourth and sixth steps, returning to said first step and repeating again each of said steps with a changed heat input condition; and finally;

setting a heat input condition which satisfies both of said fourth and sixth steps as a final heat input condition.

That is, according to the present invention, all said steps are carried out in said order to heat the bolt, thereby a large power can be supplied while the temperature range not to deteriorate the material of the bolt with hole is maintained, so that the bolt with hole is heated to be elongated quickly and fastening and loosening of the bolt can be done appropriately.

Also, it is a feature of the present invention to provide a high frequency heating method of a bolt with hole, characterized in that said non-steady temperature analysis is a numerical analysis by a finite element method.

BRIEF DESCRIPTION OF THE DRAWINGS

FIG. 4 shows respective characteristics when the bolt with hole with respect to a first and the second embodiments according to the present invention is heated, wherein

DESCRIPTION OF THE PREFERRED EMBODIMENTS

A first and a second embodiments according to the present invention are described with reference to FIGS. 1 to 5.

Figure 1:
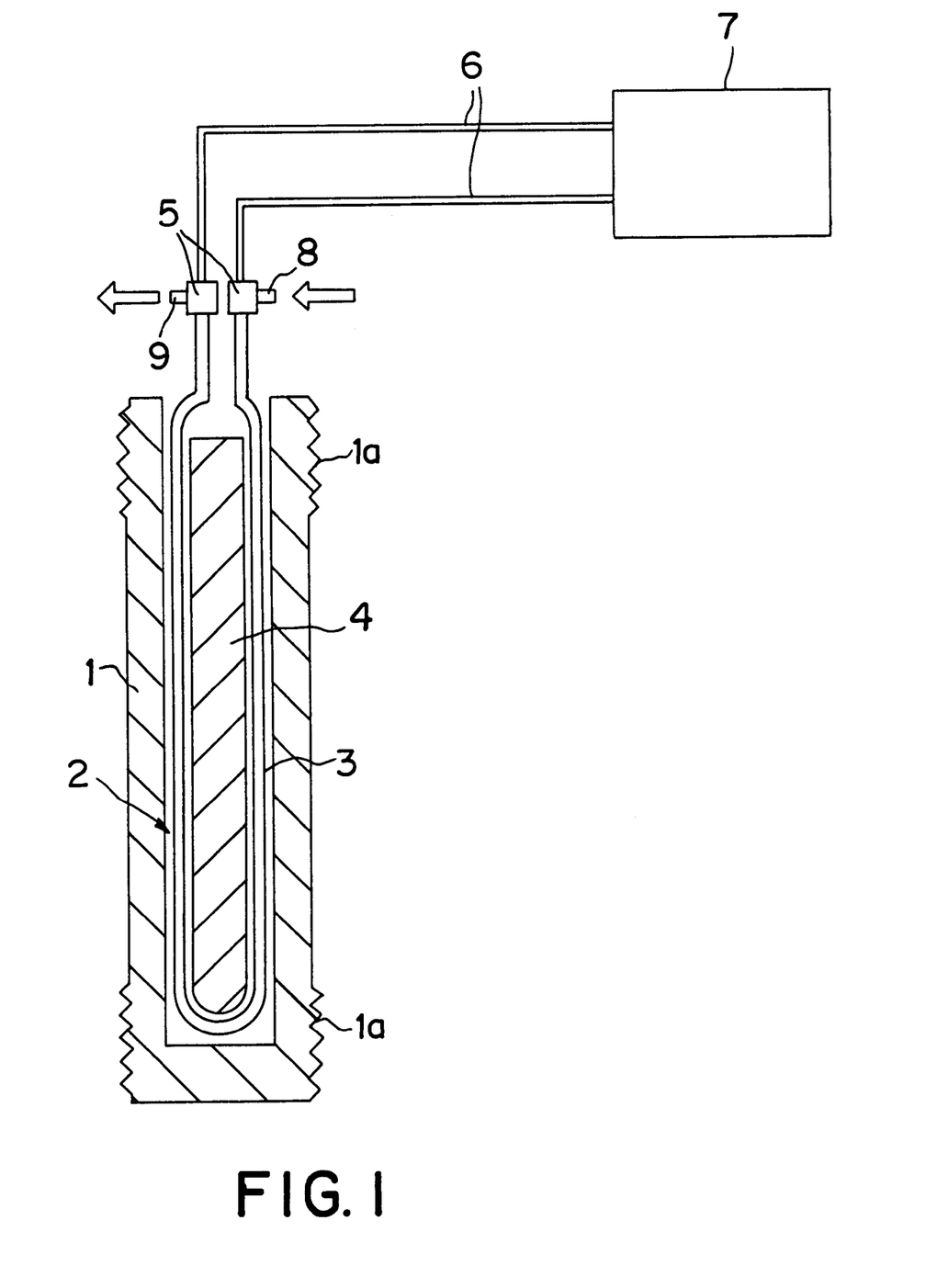
FIG. 1 is a cross sectional view of a bolt with hole having a coil inserted therein for explaining a high frequency heating method of a bolt with hole with respect to a second embodiment according to the present invention.
Figure 2:
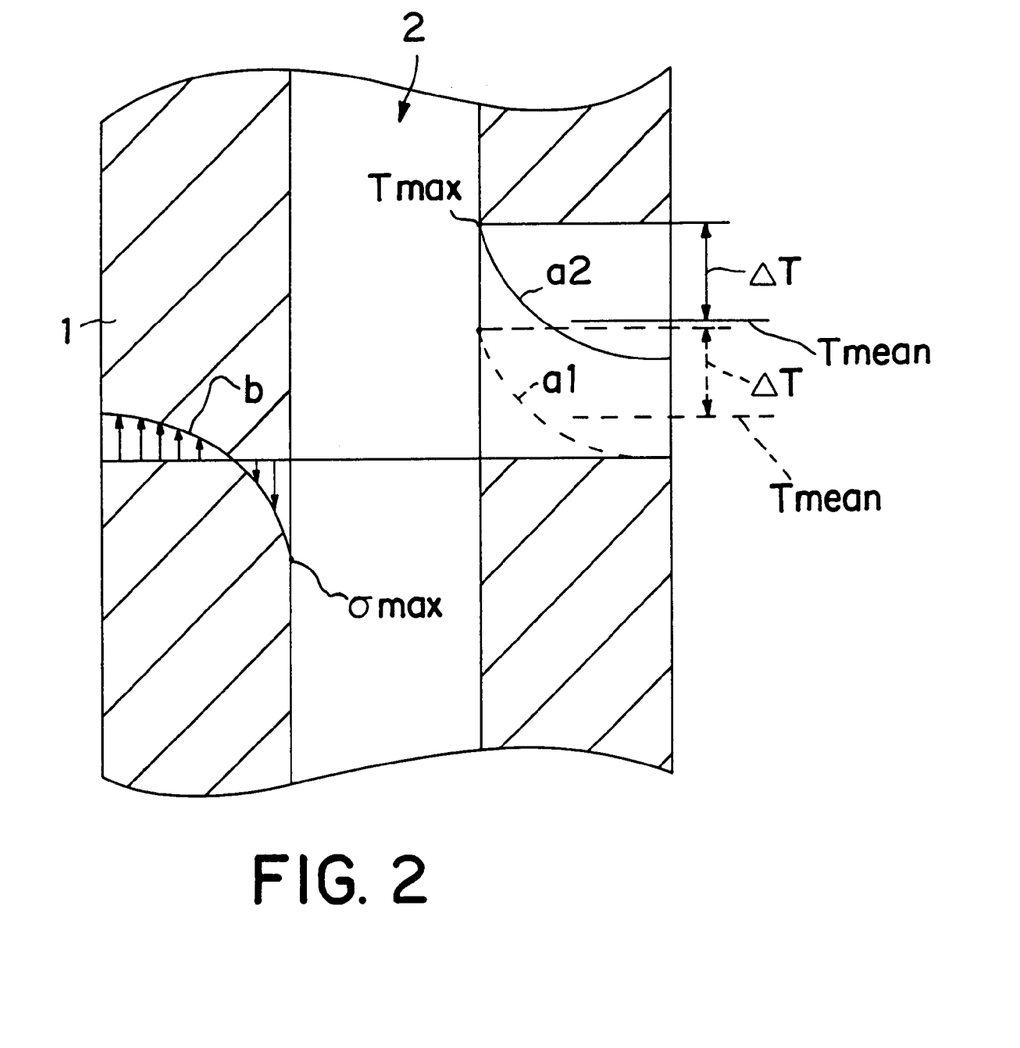
FIG. 2 is a cross sectional view showing a temperature distribution and a thermal stress distribution of the bolt with hole with respect to the second embodiment.
Figure 3:
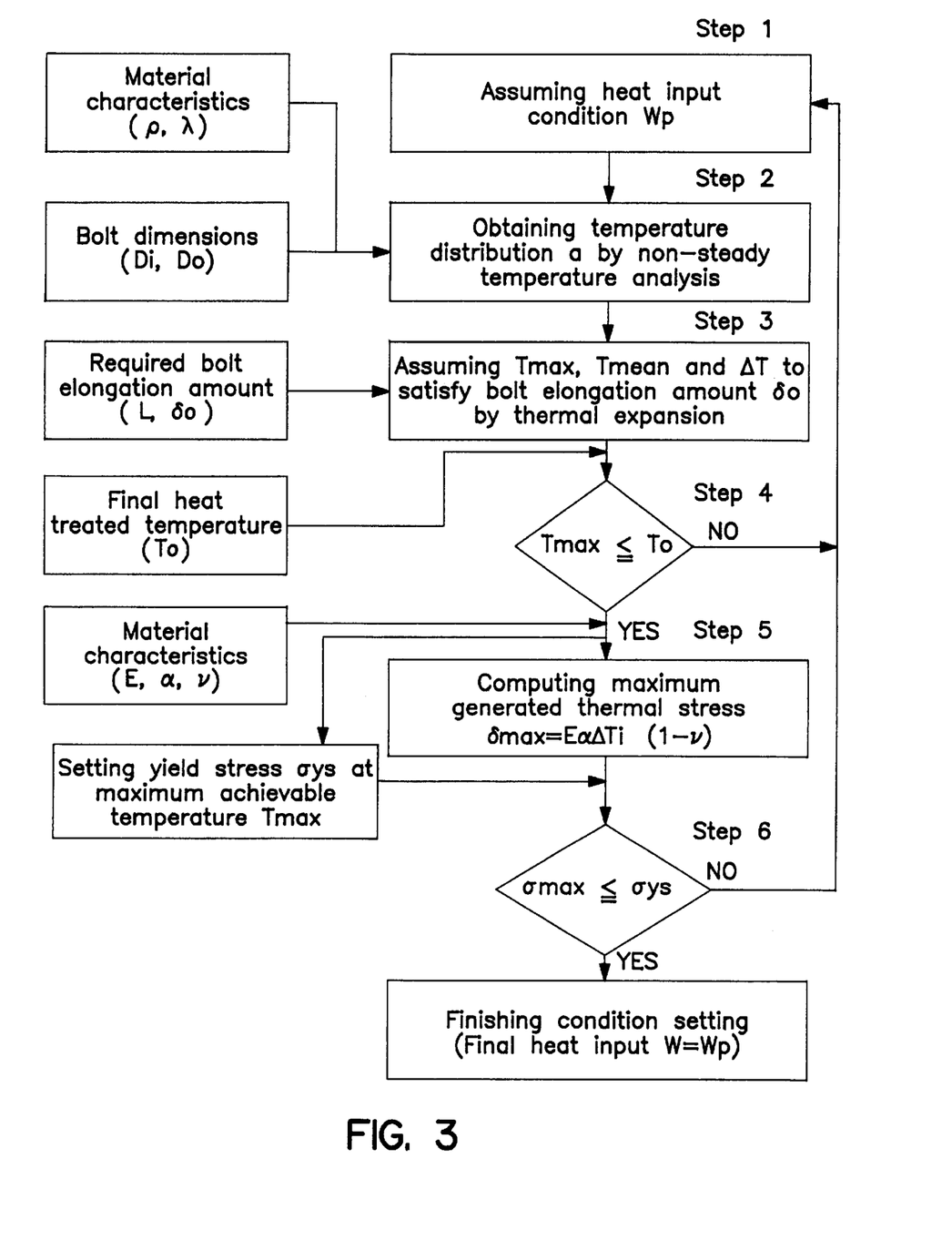
FIG. 3 is a flow chart for setting a heat input condition to the bolt with hole with respect to the second embodiment.
Figure 4A:
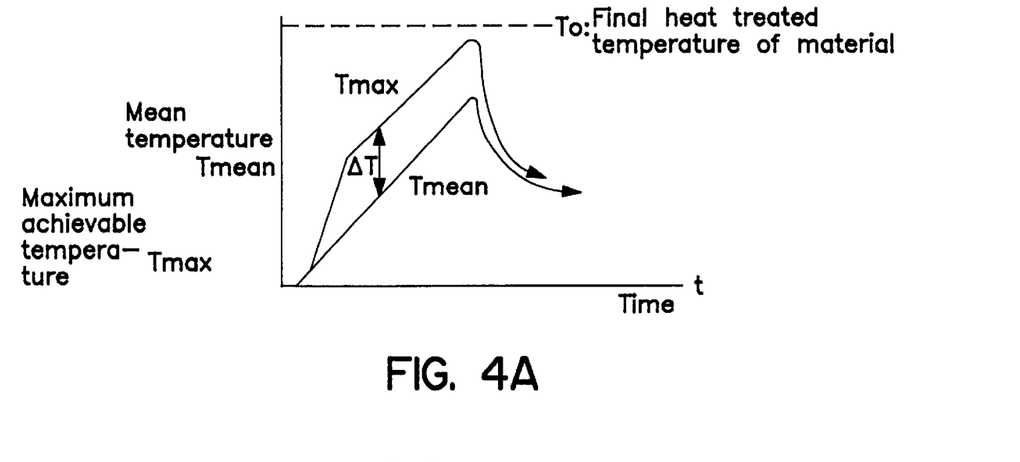
FIG. 4(a) is a characteristic diagram of a maximum achievable temperature Tmax and a mean temperature Tmean.
Figure 4B:
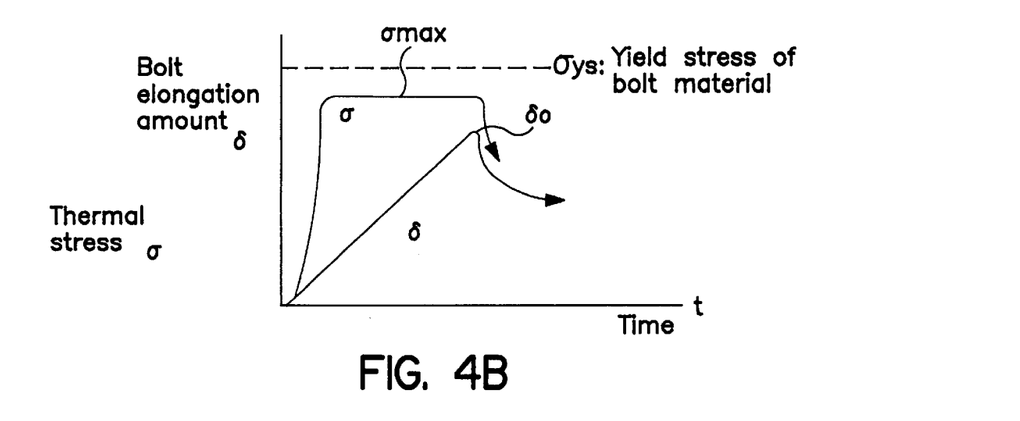
FIG. 4(b) is a characteristic diagram of a thermal stress and an elongation amount of the bolt with hole and FIG. 4(c) is a characteristic diagram of a supplied power.
Figure 4C:
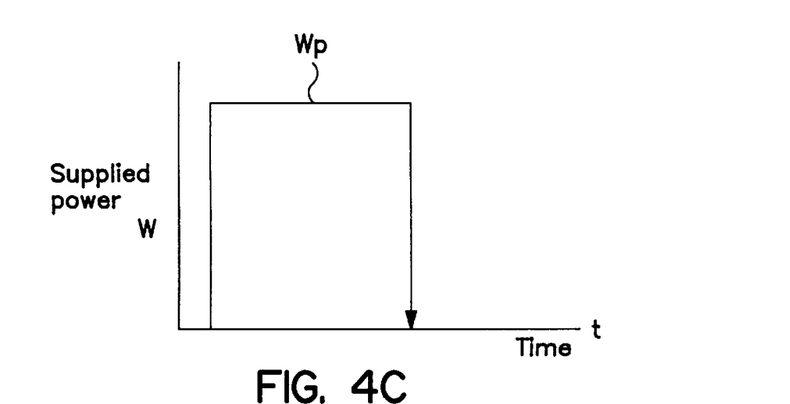
Figure 5:
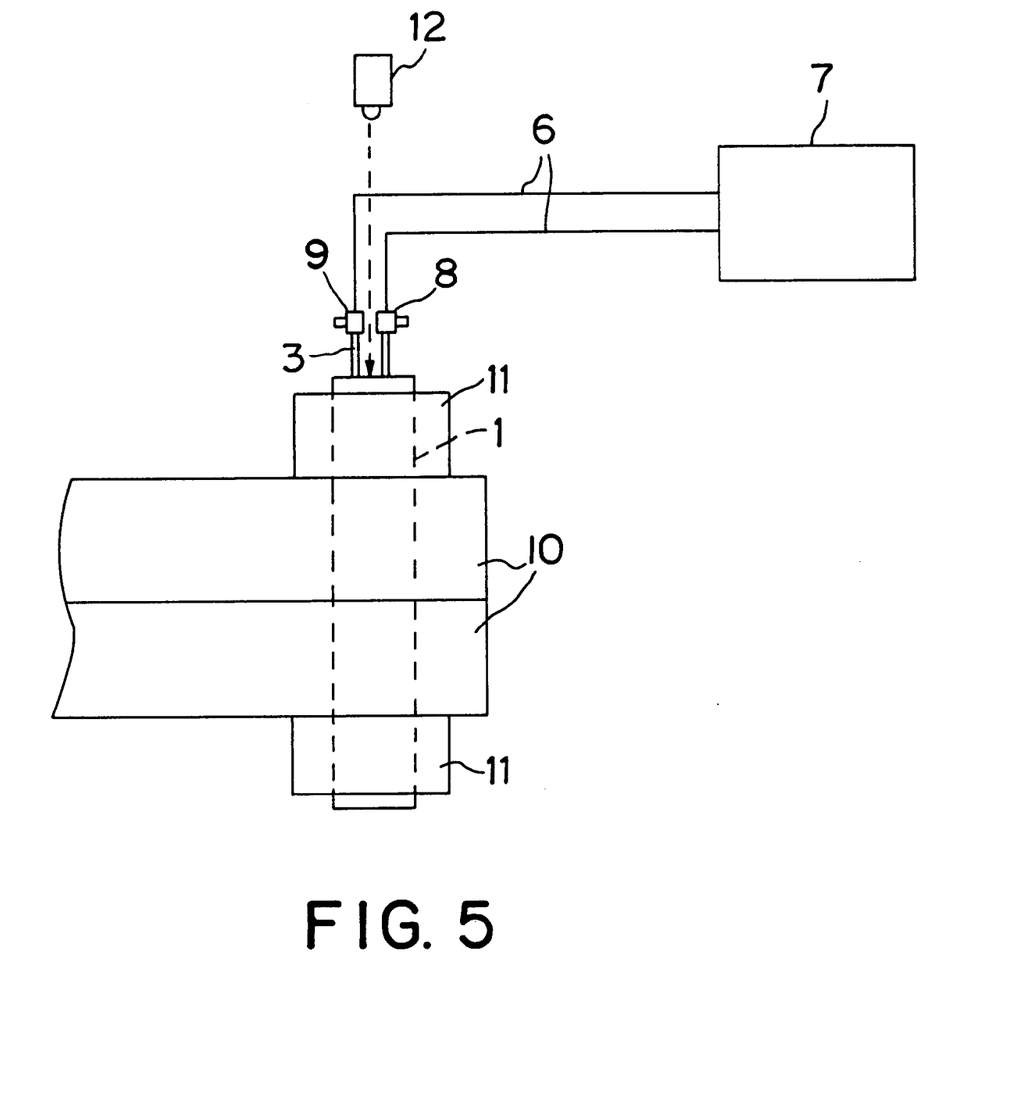
FIG. 5 is a side view showing a state where the bolt with hole fastened to a flange of an equipment with respect to the second embodiment is being heated.

FIG. 1 is a cross sectional view of a bolt with hole into which a coil is inserted, FIG. 2 is a cross sectional view showing a temperature distribution and a thermal stress distribution of the bolt with hole, FIG. 3 is a flow chart for setting a heat input condition of the bolt with hole, FIG. 4 shows characteristics when the bolt with hole is heated, wherein FIG. 4(a) is a characteristic diagram of a maximum achievable temperature Tmax and a mean temperature Tmean, FIG. 4(b) is a characteristic diagram of a thermal stress and an elongation amount of the bolt with hole and FIG. 4(c) is a characteristic diagram of a supplied power, and FIG. 5 is a side view showing a state where the bolt with hole which is fastened to a flange of equipment is being heated.

A high frequency heating method of a bolt with hole with respect to the first embodiment according to the present invention is described with reference to FIG. 4 (as well as FIG. 6). It is to be noted that the present description is made on a case where the metal bolt 22 is loosened from the flange 21.

In the high frequency heating method of a bolt with hole with respect to the present embodiment, a maximum supplyable power is obtained in advance by an operation as described later and then the heater 20 is inserted into the small diameter hole 22a of the metal bolt 22, which is set to the flange 21 and fastened by the nut 25 via the spherical washer 26, to come to a position of the stopper 13 and a high frequency power of the value obtained by said operation is supplied to the heater 20, so that the metal bolt 22 is heated to be elongated.

Next, an operation process of the maximum supplyable power to be obtained in advance is described.

First, the maximum achievable temperature Tmax achieved by the heating in the inner surface of the small diameter hole 12a of the metal bolt 12 is set to a value so as to satisfy;

Tmax<Final heat treated temperature To of the bolt material.

Also, the maximum thermal stress σmax generated by the temperature difference between the inner surface temperature and the outer surface temperature of the metal bolt 22 at the time of heating is set to a value so as to satisfy;

σmax<Yield stress σys of the bolt material at Tmax.

Then, a temperature difference ΔT (=Tmax−Tmean) between the maximum achievable temperature Tmax in the inner surface of the metal bolt 22 and a mean temperature Tmean along an entire cross section of the bolt at the time of heating is obtained by use of the following equation;

$$\sigma max \geq E\alpha\Delta T/(1-v)$$

$$\Delta T \leq \Delta Tmax < \Delta To,$$

where E is a Young's modulus, α is a thermal expansion coefficient and v is a Poisson's ratio, all of which are values decided by the material of the metal bolt 22, and ΔTmax is a permissible maximum temperature difference at the time of actual application and is set in consideration of irregularities in the material characteristics (heat conductivity, specific heat, specific gravity, Young's modulus, Poisson's ratio, linear expansion coefficient) and ΔTo is a permissible maximum temperature difference obtainable from the yield stress of the material.

Finally, by use of the ΔTmax and ΔT obtained as above and bolt dimensions which are known data, the maximum supplyable power to be supplied to the heater 20 at the time of heating of the metal bolt 22 is obtained by performing a numerical analysis by way of a finite element method.

In the above, the power supplied to the heater 20 is as shown in FIG. 4(c) and the value thereof is that computed as above, hence the thermal stress in the surface of the small diameter hole of the bolt becomes not more than the yield stress σys of the bolt at the maximum achievable temperature Tmax so as to come within a range of the elastic stress as shown in FIG. 4(b), thereby the life consumption due to fatigues can be suppressed.

Also, the maximum achievable temperature Tmax in the surface of the small diameter hole of the bolt at the time of heating becomes not higher than the final heat treated temperature To of the bolt material as shown in FIG. 4(a) and lowering of the material strength of the metal bolt can be prevented.

Actual Example

The high frequency heating method of a bolt with hole with respect to the present embodiment has been applied to fastening and loosening of a heat resistant ferritic steel bolt and contents thereof are described below.

The heat resistant ferritic steel bolt has dimensions of length of 1,100 mm, outer diameter of 96 mm and inner diameter of 22 mm, and this bolt material is of a Young's modulus E of 21,000 kgf/mm², a Poisson's ratio ν of 0.3 and a thermal expansion coefficient α of 1.2×10⁻⁵ 1/°C. As the final heat treated temperature To is 650 to 700° C., the maximum achievable temperature Tmax is set to 600° C. and the yield stress σys of the bolt material at this temperature is 50 kgf/mm².

ΔT (=Tmax−Tmean) obtained from the above data is 138° C., and carrying out a numerical analysis by a finite element method by use of these values of ΔT. Tmax and bolt dimensions, the maximum supplyable power is 20 kw.

Said power was supplied to the heater 20 provided within the small diameter hole 22a of the bolt 22 with result that the bolt 22 was able to be loosened in a short time and it was found that the heating was done without causing fatigue damages.

Next, a second embodiment according to the present invention is described.

In FIG. 1, a central hole 2 is formed within a bolt with hole 1 and a coil 3 is inserted into the central hole 2. There are provided threaded portions 1a for fastening nuts 11, to be described later, at both end portions of the bolt with hole 1.

Within the coil 3 provided is a magnetic substance 4. To an upper end portion of the coil 3 connected are two electrode portions 5, which are on one hand connected to a load dispatching portion 7 via cables 6. At one of the electrode portions 5, an inflow portion 8 of a cooling water is provided and at the other one, a drain portion 9 of the cooling water is provided.

The cooling water enters from the inflow portion 8 to flow in an interior of the coil 3 and flows out of the drain portion 9. Upon a high frequency current being supplied to the coil 3 from the load dispatching portion 7, an eddy current occurs in an inner surface of the central hole 2 and the inner surface of the central hole 2 is heated exothermically by Joule's heat. The heat is transmitted toward an outer surface of the bolt with hole 1 so that the entire bolt with hole 1 is heated quickly, and the bolt with hole 1 expands to elongate in its axial direction.

FIG. 2 shows a temperature distribution in the bolt with hole 1 while it is being heated by the high frequency current being supplied to the coil 3 and a thermal stress distribution occurring by the heating. In FIG. 2, a dashed line a1 is the temperature distribution while the heating is carried out and a continuous line a2 is the temperature distribution when the heating is finished and a continuous line b is the thermal stress distribution.

Also in FIG. 2, Tmax is a maximum achievable temperature at the inner surface of the central hole 2. Tmean is a mean temperature of an entire cross section of the bolt with hole 1 and ΔT is a temperature difference between the maximum achievable temperature Tmax and the mean temperature Tmean.

σmax is a maximum thermal stress (a maximum generated thermal stress) generated in the surface of the central hole 2 due to the temperature difference ΔT. The maximum thermal stress σmax must be not more than a yield stress of the bolt with hole 1. The yield stress σys in relation with the maximum thermal stress σmax and the temperature difference ΔT is expressed by the following equation;

$$\sigma ys > \sigma max = [E\alpha/(1-\nu)]\, \Delta T$$

where E is a Young's modulus, α is a thermal expansion coefficient and ν is a Poisson's ratio.

As is seen from the above equation, the maximum thermal stress σmax is proportional to the temperature difference ΔT and as the temperature difference ΔT becomes larger, the maximum thermal stress σmax becomes larger than the yield stress σys with result that the material of the bolt with hole 1 is deteriorated.

In the present embodiment, therefore, while the temperature difference ΔT is maintained within the range of the maximum thermal stress σmax not exceeding the yield stress σys, the high frequency current is supplied to the coil 3 and the bolt with hole 1 is heated.

Next, with reference to FIG. 3, the high frequency heating method of the bolt with hole 1 is described. First, a heat input condition Wp is assumed (Step 1). The heat input condition Wp is a supplied power (watt) to be supplied to the coil 3.

Then, based on the heat input condition Wp and material characteristics ρ, λ and dimensions Di, Do of the bolt with hole 1, the temperature distribution a within the bolt with hole 1 is obtained by a non-steady temperature analysis (Step 2), where ρ is a density, λ is a heat conductivity, Di is an inner diameter of the bolt 1 and Do is an outer diameter of same. Also, as for the non-steady temperature analysis, a numerical analysis of a finite element method and the like is used.

Then, based on the temperature distribution a obtained by the Step 2, maximum achievable temperature conditions to satisfy an elongation amount δo required of the bolt with hole 1, that is, the maximum achievable temperature Tmax, the mean temperature Tmean of an entire cross section of the bolt with hole 1 and the temperature difference ΔT between the maximum achievable temperature Tmax and the mean temperature Tmean, are assumed (Step 3).

That is, in the Step 3, a required temperature elevation value (difference between the mean temperature and a temperature before heating) which corresponds to a thermal expansion amount in the axial direction of the bolt with hole 1 to satisfy the elongation amount δo is obtained by computation and the computation result is compared with the temperature distribution a obtained by the Step 2. Incidentally, L is a length of the bolt with hole 1.

If said temperature distribution does not satisfy the required temperature elevation value obtained by the above computation, the heat input condition is to be re-set. If the required temperature distribution is satisfied, the temperature difference ΔT between the maximum achievable temperature Tmax and the mean temperature Tmean is computed.

Then, a decision is made on whether the maximum achievable temperature Tmax is not more than the final heat treated temperature To or not (Step 4). The final heat treated temperature To is the final heat treated temperature when a heat treatment is applied to the bolt with hole 1 and this final heat treated temperature To means a temperature at which the material of the bolt with hole 1 would be deteriorated if the heating is carried out further.

And in the Step 4, if the decision is that the maximum achievable temperature Tmax is higher than the final heat treated temperature To, that is, "No", the step is returned to the Step 1 and above-mentioned Steps are to be repeated with a changed heat input condition Wp.

Then, based on the temperature difference ΔT and the material characteristics E, α, ν of the bolt with hole 1, the maximum thermal stress σmax is obtained by the Equation mentioned above (Step 5). E is a Young's modulus, α is a thermal expansion coefficient and ν is a Poisson's ratio, same as mentioned above.

And a decision is made on whether the maximum thermal stress σmax obtained by the Step 5 is not more than the yield stress νys of the bolt with hole 1 at the maximum achievable temperature Tmax or not (Step 6).

If the decision is that the maximum thermal stress νmax is higher than the yield stress σys, that is, "No", the step is returned to the Step 1 and above-mentioned steps are to be repeated with a changed heat input condition Wp.

On the other hand, if the decision is "Yes", the heat input condition to satisfy each of the mentioned Steps finally is set as the final heat input condition W≡Wp, thus the condition setting is finished.

The bolt with hole 1 is heated in accordance with the final heat input condition Wp set by the mentioned Steps and the temperature, elongation amount and thermal stress of the bolt with hole at this time are described with reference to FIGS. 4(a) to 4(c).

FIG. 4(c) shows shows a power supplied to the coil 3 in accordance with the final heat input condition Wp. As the power is supplied, the mean temperature Tmean and the maximum achievable temperature Tmax are elevated as shown in FIG. 4(a), wherein, however, the final heat input condition is set so that the temperature difference ΔT may not exceed a certain value, that is, the thermal stress a may not exceed the yield stress σys as shown in FIG. 4(b), in the whole process of the heating as well as so that the maximum achievable temperature Tmax may not exceed the finala heat treated temperature To.

Thus, as shown in FIG. 4(b), the bolt with hole 1 is heated until a predetermined elongation amount δo is obtained while the mentioned condition is being satisfied.

FIG. 5 shows a state where the bolt with hole 1 which is fastened to a flange of equipment is being heated in accordance with the final heat input condition obtained as mentioned above.

The bolt with hole 1 is fastened by a nut 11 to the flange 10 of equipment of a steam turbine casing and the like. A high frequency current is supplied to a coil 3 which is inserted into a central hole 2 of the bolt with hole 1, thus the bolt with hole 1 is heated.

An elongation amount of the bolt with hole 1 is measured by a sensor 12 and if the elongation amount comes to a predetermined amount, load dispatching is stopped. In this case, the bolt with hole 1 is heated quickly while the conditions of the Step 4 and the Step 6 shown in FIG. 3 are being satisfied.

In the above, the present invention has been described with respect to the embodiments shown in the figures but, needless to mention, the present invention is not limited to such embodiments but may be added with various modifications in the detailed structure within the scope of the claims as mentioned below.

According to the present invention as described above, the maximum achievable temperature Tmax in the inner surface of the bolt with hole while it is being heated is set to a value which is not higher than the final heating temperature To of the bolt material; the maximum thermal stress σmax occurring in the bolt with hole while it is being heated is set to a value which is not more than the yield stress σys of the bolt material at the maximum achievable temperature Tmax; the temperature difference ΔT between the maximum achievable temperature Tmax and the mean temperature Tmean along an entire cross section of the bolt is obtained from the maximum thermal stress σmax on condition that the temperature difference ΔT is to be not more than the permissible maximum temperature difference ΔTo obtainable from the yield stress of the bolt material; and the maximum supplyable power is obtained by the maximum achievable temperature Tmax, the temperature difference ΔT and dimensions of the bolt, and then the heater is inserted into the small diameter hole of the bolt with hole and the maximum supplyable power of which value is obtained by said operation is supplied to the heater so that the bolt with hole is heated to be elongated, thereby the temperature of the bolt with hole while it is being heated is not higher than the final heat treated temperature To of the bolt material, hence lowering of the material strength can be prevented. Also the thermal stress is not more than the yield stress σys of the bolt material, hence the life consumption due to fatigues can be suppressed and loosening of the bolt with hole within a short time becomes possible.

Also, according to the present invention, in the high frequency heating method of a bolt with hole in which the bolt with hole fastening a flange of an equipment together with a nut is inserted with a coil into a central hole of the bolt and is fastened and loosened by being heated to be elongated by Joule's heat caused by a high frequency current being supplied to the coil and an eddy current being generated in an inner surface of the central hole of the bolt with hole;

assuming the heat input condition of a heat input given to the bolt with hole by the coil, as the first step; obtaining the temperature distribution in the bolt with hole by a non-steady temperature analysis, based on the assumed heat input condition and material characteristics and dimensions of the bolt with hole, as the second step;

assuming the maximum achievable temperature Tmax, the mean temperature Tmean along an entire cross section of the bolt with hole and the temperature difference ΔT between the maximum achievable temperature Tmax and the mean temperature Tmean, based on the temperature distribution, so as to satisfy the elongation amount required of the bolt with hole, as the third step; deciding whether the maximum achievable temperature Tmax is not higher than the final heating temperature To of the bolt with hole or not, as the fourth step; obtaining the maximum thermal stress σmax occurring in the bolt with hole, based on the temperature difference ΔT and the material characteristics of the bolt with hole, as the fifth step; and deciding whether the maximum thermal stress σmax is not more than the yield stress σys of the bolt with hole at the maximum achievable temperature Tmax or not, as the sixth step; and if a decision of "No" is given to any one of the fourth and sixth steps, returning to the first step and repeating again each of the steps with a changed heat input condition; and finally;

setting the heat input condition which satisfies both of the fourth and sixth steps as the final heat input condition; and based on said conditions, the high frequency heating method of the bolt with hole is carried out.

Thus, the bolt is heated in accordance with the heat input condition as set by said steps carried out in said order, thereby a large power is supplied to the coil while the temperature range not to deteriorate the material of the bolt with hole is maintained, so that the bolt with hole is heated to be elongated quickly and fastening and loosening of the bolt with hole can be done appropriately, thus a high frequency heating method of a bolt with hole which is useful and has a high reliability has been obtained.

What is claimed is:

1. A high frequency heating method of a bolt with hole in which the bolt with hole fastening an equipment is inserted with a coil into a central hole of the bolt and is fastened and loosened by being heated to be elongated by Joule's heat caused by a high frequency current being supplied to the coil and an eddy current being generated in an inner surface of the central hole of the bolt with hole, comprising a step of setting a heat input condition of a heat input given to the bolt with hole by the coil so that a thermal expansion of the bolt with hole by the heating satisfies an elongation amount required of the bolt with hole, a maximum achievable temperature Tmax by the heating is not higher than a final heat treated temperature To of the bolt with hole and a maximum thermal stress σmax induced by the heating is not more than a yield stress σys of the bolt with hole at said maximum achievable temperature Tmax.

2. A high frequency heating method of a bolt with hole applicable to fastening and loosening of the bolt with hole used for fastening an equipment and provided with a small diameter hole along an axial center of the bolt, comprising steps of inserting a heater into the small diameter hole of the bolt with hole; and supplying a maximum supplyable power obtained by an operation mentioned below to the heater so that said bolt with hole is heated to be elongated, said operation comprising steps of;

setting a maximum achievable temperature Tmax in an inner surface of the bolt with hole while being heated to a value which is not higher than a final heat treated temperature To of a bolt material of the bolt with hole;

setting a maximum thermal stress σmax occurring in the bolt with hole while being heated to a value which is not more than a yield stress σys of the bolt material at said maximum achievable temperature Tmax;

obtaining from said maximum thermal stress σmax a temperature difference ΔT between said maximum achievable temperature Tmax and a mean temperature Tmean along an entire cross section of the bolt on condition that said temperature difference ΔT is to be not more than a permissible maximum temperature difference ΔTo obtainable from the yield stress of the bolt material; and obtaining the maximum supplyable power by said maximum achievable temperature Tmax, said temperature difference ΔT and dimensions of the bolt.

3. A high frequency heating method of a bolt with hole in which the bolt with hole fastening an equipment is inserted with a coil into a central hole of the bolt and is fastened and loosened by being heated to be elongated by Joule's heat caused by a high frequency current being supplied to the coil and an eddy current being generated in an inner surface of the central hole of the bolt with hole, comprising steps of;

assuming a heat input condition of a heat input given to the bolt with hole by the coil;

obtaining a temperature distribution in the bolt with hole by a non-steady temperature analysis, based on said assumed heat input condition and material characteristics and dimensions of the bolt with hole;

deciding that a thermal expansion of the bolt with hole by said temperature distribution satisfies an elongation amount required of the bolt with hole, a maximum achievable temperature Tmax in said temperature distribution is not higher than a final heat treated temperature To of the bolt with hole and a maximum thermal stress σmax induced by said temperature distribution is not more than a yield stress σys of the bolt with hole at said maximum achievable temperature Tmax; and setting said heat input condition as a final heat input condition.

4. A high frequency heating method of a bolt with hole in which the bolt with hole fastening a flange of an equipment together with a nut is inserted with a coil into a central hole of the bolt and is fastened and loosened by being heated to be elongated by Joule's heat caused by a high frequency current being supplied to the coil and an eddy current being generated in an inner surface of the central hole of the bolt with hole, comprising steps of;

setting a heat input condition of a heat input given to the bolt with hole by said coil so that a thermal expansion of the bolt with hole by the heating satisfies an elongation amount required of the bolt with hole, a maximum achievable temperature Tmax by the heating is not higher than a final heat treated temperature To of the bolt with hole and a maximum thermal stress σmax induced by the heating is not more than a yield stress σys of the bolt with hole at said maximum achievable temperature Tmax;

heating the bolt with hole by said coil in accordance with said heat input condition while measuring the elongation amount of the bolt with hole by a measuring means; and stopping the heating by said coil upon the elongation amount of the bolt with hole arriving at a predetermined elongation amount.

5. A high frequency heating method of a bolt with hole in which the bolt with hole fastening a flange of an equipment together with a nut is inserted with a coil into a central hole of the bolt and is fastened and loosened by being heated to be elongated by Joule's heat caused by a high frequency current being supplied to the coil and an eddy current being generated in an inner surface of the central hole of the bolt with hole, comprising steps of;

a first step to assume a heat input condition of a heat input given to the bolt with hole by said coil, a second step to obtain a temperature distribution in the bolt with hole by a non-steady temperature analysis, based on said assumed heat input condition and material characteristics and dimensions of the bolt with hole, a third step to assume a maximum achievable temperature Tmax, a mean temperature Tmean along an entire cross section of the bolt with hole and a temperature difference ΔT between said maximum achievable temperature Tmax and said mean temperature Tmean, based on said temperature distribution, so as to satisfy an elongation amount required by the bolt with hole, a fourth step to decide whether said maximum achievable temperature Tmax is not higher than a final heat treated temperature To of the bolt with hole or not, a fifth step to obtain a maximum thermal stress σmax occurring in the bolt with hole, based on said temperature difference ΔT and the material characteristics of the bolt with hole, and a sixth step to decide whether said maximum thermal stress σmax is not more than a yield stress σys of the bolt with hole at said maximum achievable temperature Tmax or not; and if a decision of "No" is given to any one of said fourth and sixth steps, returning to said first step and repeating again each of said steps with a changed heat input condition; and finally;

setting a heat input condition which satisfies both of said fourth and sixth steps as a final heat input condition.

6. A high frequency heating method of a bolt with hole as claimed in any one of claims 3 and 5, wherein said non-steady temperature analysis is a numerical analysis by a finite element method.

* * * * *